(12) United States Patent
Hoffeld

(10) Patent No.: US 8,322,502 B2
(45) Date of Patent: Dec. 4, 2012

(54) HYDRODYNAMIC COUPLING

(75) Inventor: Harald Hoffeld, Crailsheim (DE)

(73) Assignee: Voith Turbo GmbH & Co. KG, Heidenheim (DE)

(*) Notice: Subject to any disclaimer, the term of this patent is extended or adjusted under 35 U.S.C. 154(b) by 758 days.

(21) Appl. No.: 12/226,292

(22) PCT Filed: Apr. 12, 2007

(86) PCT No.: PCT/EP2007/003276
§ 371 (c)(1),
(2), (4) Date: Aug. 3, 2009

(87) PCT Pub. No.: WO2007/118683
PCT Pub. Date: Oct. 25, 2007

(65) Prior Publication Data
US 2009/0314597 A1    Dec. 24, 2009

(30) Foreign Application Priority Data
Apr. 13, 2006  (DE) .................. 10 2006 017 975

(51) Int. Cl.
*F16D 47/06* (2006.01)
*F16D 33/06* (2006.01)
*F16D 33/18* (2006.01)
*F16D 13/75* (2006.01)
(52) U.S. Cl. . 192/3.31; 192/30 W; 192/57; 192/105 CD
(58) Field of Classification Search ............. 188/1.11 W
See application file for complete search history.

(56) References Cited

U.S. PATENT DOCUMENTS

| 2,027,970 | A | * | 1/1936 | Gillies ................... 192/105 BA |
| 2,380,734 | A |   | 7/1945 | Eastin ........................ 192/3.31 |
| 3,533,491 | A | * | 10/1970 | Svenson .................. 188/1.11 W |
| 3,983,964 | A | * | 10/1976 | Beals et al. ............. 188/1.11 W |
| 4,186,822 | A | * | 2/1980 | Khuntia et al. ......... 188/1.11 W |
| 6,460,659 | B1 | * | 10/2002 | Schaffer et al. ......... 188/1.11 W |
| 6,502,678 | B1 | * | 1/2003 | Hoffeld ........................ 192/3.31 |

FOREIGN PATENT DOCUMENTS

| DE | 374 259 | 4/1923 |
| DE | 1 775 184 | 7/1968 |
| DE | 39 17 986 | 6/1989 |
| DE | 199 42 578 | 4/2001 |
| FR | 2 561 342 | 3/1985 |
| WO | WO 82/04107 | 11/1982 |
| WO | WO 01/18429 | 3/2001 |

* cited by examiner

*Primary Examiner* — Rodney Bonck
(74) *Attorney, Agent, or Firm* — Ohlandt, Greeley, Ruggiero & Perle, L.L.P.

(57) ABSTRACT

The invention relates to a hydrodynamic coupling having two blade wheels, namely, an outer wheel and an inner wheel, The hydrodynamic coupling also has a coupling shell. The invention provides that the inner wheel and the coupling shell each have one hole and the holes are situated on the hydrodynamic coupling and can be moved into positions that are aligned with one another when the inner wheel and the coupling shell are rotated. The hole of the coupling shell is larger than the hole of the inner wheel. A measuring pin for passing through the two holes.

5 Claims, 3 Drawing Sheets

HYDRODYNAMIC COUPLING

The invention relates to a hydrodynamic coupling, in particular a turbo coupling, in detail with the features taken from the preamble of claim 1.

Hydrodynamic couplings having clutches for synchronization, in particular in the form of frictional couplings actuated by centrifugal force are known in a large number of designs. See, for example, only WO 82/04107 A1 or DE 199 42 578 C2.

Described in WO 82/04107 A1 is a clutch that can be actuated by a fluid pressure dependent on centrifugal force. In this design, the synchronizer clutch is arranged outside of the hydrodynamic coupling. The synchronizer clutch and the hydrodynamic coupling are coupled to each other in such a way that leads, on the one hand, to a substantial enlargement of the required structural space in the axial direction and, on the other hand, substantially increases the expense of construction.

The publication DE 199 42 578 C2 describes the structural design of a hydrodynamic coupling in which a synchronizer clutch can be integrated in such a way that no additional space is required in comparison to a conventional hydrodynamic coupling without a synchronizer clutch. Such couplings have proven themselves extremely well up to now. The integration of the synchronizer clutch into the hydrodynamic coupling results in a saving of structural space. The effort involved in fabrication and assembly is low and accordingly the manufacturing costs are low as well.

However, a disadvantage consists in the fact that the friction lining between the two clutch elements of the hydrodynamic coupling is subject to a certain degree of wear. This wear is not evident from the outside. Also, the synchronizer clutch can still work flawlessly when the friction lining is worn to a great extent. Thus, functional capability is feigned even though it is still afforded for only a short period of time. In the case of hydraulic couplings having integrated synchronizer clutches, this can be dangerous in safety-relevant equipment.

In order to create certainty about the actual state of wear of the friction lining, the entire unit has to be dismounted and disassembled. In order to be safe, the dismounting is carried out, as a precaution, at an early point in time and thus already when the wear of the friction lining is not expected to be complete. This means that, for reasons of safety, the dismounting has to be conducted several times. This necessitates expense in terms of personnel and is therefore costly.

The invention is based on the problem of designing a hydrodynamic coupling in accordance with the preamble of claim 1 in such a way that the state of wear of the friction lining can be recognized without having to dismount and disassemble the entire coupling.

In accordance therewith, the inner wheel and also the shell are each provided with a borehole. The two holes are arranged in such a way that they can be brought into alignment with each other and thus in superposition when the inner wheel and the shell are rotated relative to each other. The holes are in the outer region, beginning, for example at three-fourths of the radius of the coupling, as measured from the rotational axis. In general, the two holes run parallel to the rotational axis. However, this need not be the case. A certain inclination of up to 60 degrees would be conceivable.

The holes need not be absolutely circular in cross section, even though this is most obviously natural for reasons of fabrication.

The hole of the shell has somewhat larger dimensions than the hole of the inner wheel.

Once the point in time has arrived when an inspection of the friction lining is desired, the following is performed:

A pin is passed through the larger hole of the shell and inserted into the smaller hole of the inner wheel.

The inner wheel is then moved in the radial direction on the shell.

This is accomplished by radial displacement so that no gap at all remains in the region of friction.

The pin is now utilized as an indicator. Only the distance between the pin and a chosen point on the shell is measured—naturally, at a position that is readily accessible from the outside. In this manner, the remaining thickness of the friction lining can be determined, provided that such thickness is still present at all.

The invention is described in more detail on the basis of the drawing. Illustrated in it, taken individually, is the following:

Figure 1:
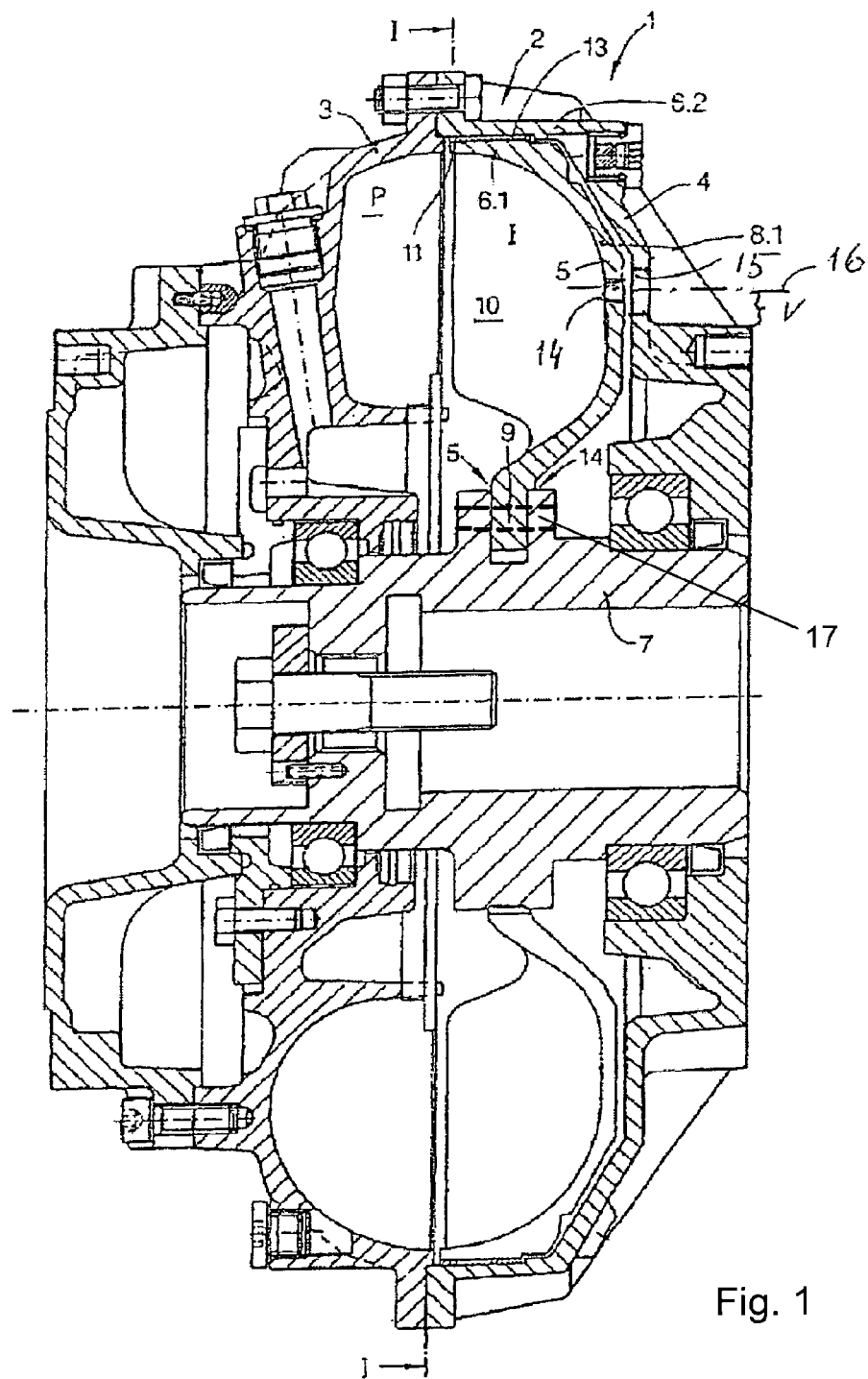
FIG. 1 shows a first embodiment of the invention with radially displaceable segments.

FIG. 1 shows the basic construction of a hydrodynamic coupling 1 designed in accordance with the invention, in particular a turbo coupling having an integrated synchronizer clutch 2, comprising two blade wheels, an outer wheel 3 and an inner wheel 5, which is enclosed at least in part by a coupling shell 4 that is coupled to the outer wheel 3. Here, the outer wheel 3 functions preferably as a pump wheel, whereas the inner wheel 5 assumes the function of a turbine wheel. For this purpose, when used in drive trains, the outer wheel 3 is connected fixedly in terms of rotation at least indirectly to the drive side of, in particular, a driving engine, whereas the inner wheel 5, constituting the turbine wheel, is coupled to the driven side. This applies to power transmission in a drive train in traction operation as viewed from the driving engine to the driven side. The synchronizer clutch 2 is integrated in the hydrodynamic coupling 1 and comprises at least two clutch elements that can be brought into frictionally engaged operative connection with one another, a first clutch element 6.1 and a second clutch element 6.2. In accordance with the invention, the clutch elements are formed by the coupling shell 4 and the inner wheel 5 of the hydrodynamic coupling. Here, the inner wheel 5 forms the clutch element 6.1 and, in accordance with the invention, is constructed as a multicomponent centrifugal force body. This means that the inner wheel 5 or the clutch element 6.1 is respectively divided into at least two segments, which, when mounted or guided, respectively, on a profiled shaft or hub 7, respectively, can move in their entirety at least in the radial direction under the action of centrifugal force. Preferably, the division is made into three individual segments 8.1, 8.2, 8.3, see FIG. 2. In this case, when arranged in succession in the peripheral direction, the individual segments form the inner wheel 5 as a structural unit and are preferably designed identically to one another in terms of their geometric dimensions. Because torques are to be transmitted via the inner wheel 5 in a hydrodynamic coupling 1, it is necessary that the inner wheel 5, in particular the individual segments, as viewed in the peripheral direction, are guided at least in such a way that a driver function is ensured, while, in the radial direction, the ability of the individual segments 8.1 to 8.3 to move under the action of centrifugal force is afforded. Provided for this purpose are means to guide the individual segments 8.1 to 8.3, which, as a rule, are formed by the profiled shaft or hub 7. The latter can be connected fixedly in terms of rotation at least indirectly. to the driven side, depending on the function of the inner wheel 5.

To this end, the profiled shaft or hub 7 has a corresponding driver profile 9 or a corresponding pivot pin 17.

During the starting operation, when the hydrodynamic coupling 1 is used with a drive train, the torque continues to be transmitted, for the most part hydrodynamically, via the flow of operating fluid established in the toroidal working chamber 10 between the outer wheel 3 and the inner wheel 5, functioning as a pump wheel P and a turbine wheel T. The smooth startup thus is maintained by exploiting the advantages of a hydrodynamic power transmission. With increasing driven speed, of course, the inner wheel is pressed ever increasingly in the direction of the coupling shell 4 on account of the action of centrifugal force, resulting from rotation, onto the individual segments 8.1 to 8.3 of the inner wheel, until, due to the pressing of the segments 8.1 to 8.3 against the coupling shell 4, a frictional engagement is created. In this state, the clutch is synchronized based on the coupling between outer wheel 3, that is pump wheel P, and coupling shell 4 as well as the inner wheel. All elements run at the same speed of rotation.

Because, during the starting operation, the individual segments 8.1 to 8.3 slide on the inner periphery 11 of the coupling shell 4, this means that the individual elements of the friction couple must have good sliding and wear properties at least in the region of the frictional engagement to be created. Decisive for the wear resistance of the friction couple established in the synchronizer clutch 2 between inner wheel 5 and coupling shell 4 are the surface pressurizing thereby established, the specific frictional energy, and the specific frictional work. Therefore, in order to minimize the wear, either appropriate materials are used for the coupling shell 4 and the inner wheel 5, in particular the individual segments 8.1 to 8.3, or else the latter are furnished with an appropriate coating. Preferably, at least for the manufacture of coupling shell 4 and pump wheel, that is, outer wheel 3, one resorts to conventional materials that usually find use for the manufacture of the individual elements of the hydrodynamic coupling 1, such as, for example, nodular graphite cast iron ("Späroguss").

The following considerations are taken into account in choosing the material for the inner wheel 5 or for the individual inner wheel segments 8.1 to 8.3. In so doing, it is advantageous for increasing the availability to provide a suitable friction couple between coupling shell 4 and the segments 8.1 to 8.3 of the inner wheel 5. In so doing, coatings having a friction lining 13 are provided either on one of the elements or on both of the elements—in particular, on the inner periphery 11 of the coupling shell and on the outer periphery 12 of the inner wheel 5, in particular, on the outer periphery 12.1 of the segment 8.1, on the outer periphery 12.2 of the segment 8.2, and on the outer periphery 12.3 of the segment 8.3. In so doing, the friction lining can be applied, on the one hand, merely on the inner periphery 11 of the coupling shell 4 or else on the outer periphery 12 of the inner wheel 5 or of the individual segments 8.1 to 8.3; however, it is also conceivable to coat both—the coupling shell 4 on its inner periphery 11 and the inner wheel 5 on its outer periphery 12 or else the individual outer peripheries 12.1 to 12.3 in the individual segments 8.1 to 8.3—with an appropriate friction lining, whereby, in this case, friction couples produced with identical materials or with different materials can be used.

Evident in the inner wheel 5 is a hole 14 and evident in the shell 4 is a hole 15. Hole 15 is clearly larger than hole 14. The axes of the two holes 14 and 15 run parallel to the rotational axis of the hydrodynamic coupling. The lie on one and the same radius or else on a deviating radius. When the inner wheel and the outer wheel (and thus also the inner wheel and the shell) rotate opposite one another, an alignment takes place, as illustrated here (superposition of the holes). See the common lengthwise axis 16 of the two holes. The axes of the two holes 14, 15 need not be absolutely in alignment with each other. It is sufficient that the holes—for a corresponding angular position of inner wheel 5 and shell 4—overlap at least partially.

Figure 3:
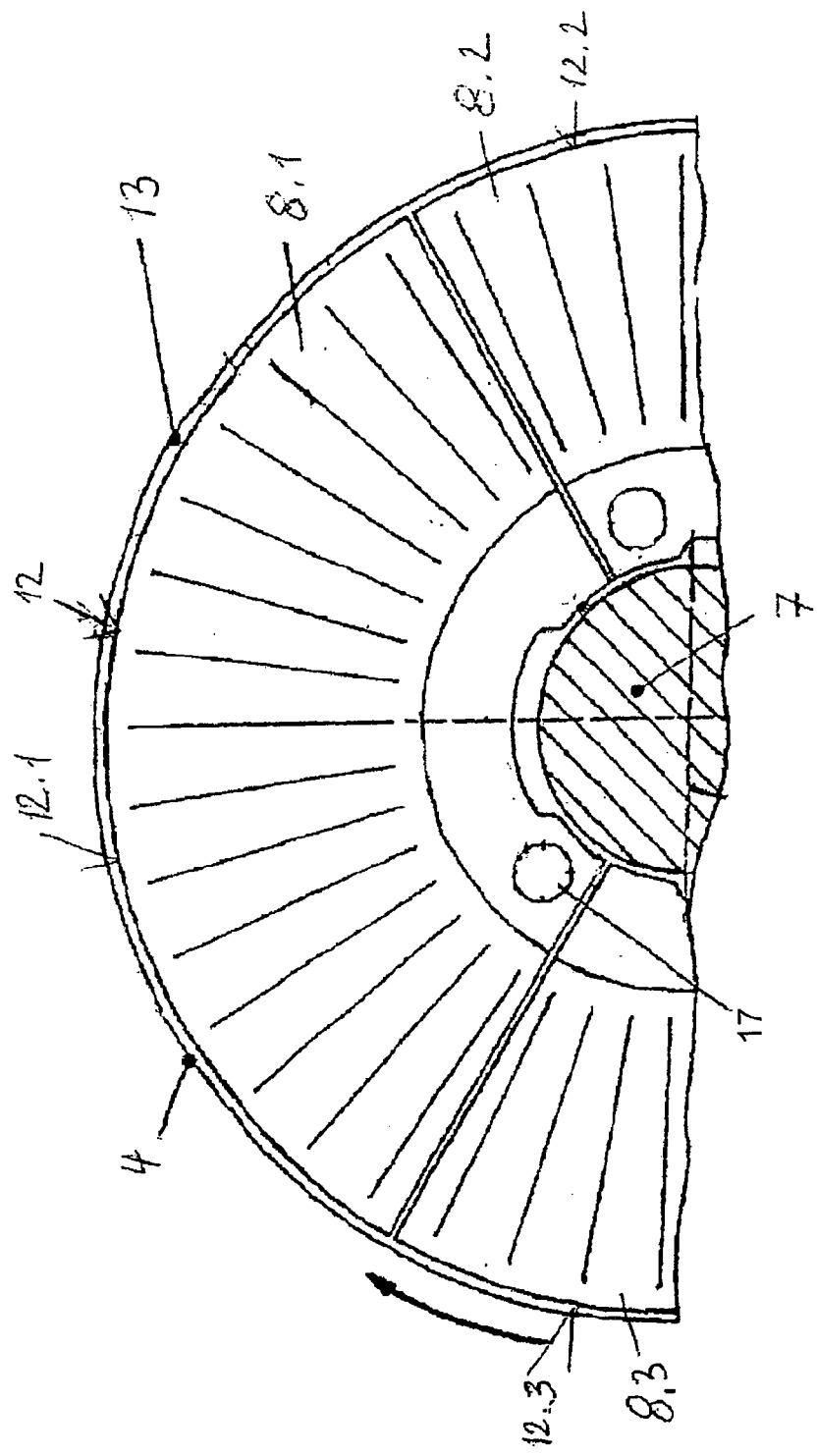
FIG. 3 shows a measuring pin.

Passed through the hole 15 in the shell 4 and inserted into the hole 14 in the inner wheel 5 is a measuring pin 18, which is shown in FIG. 3. The measuring pin 18 can be screwed into the hole 14 of the inner wheel. In addition, the two holes 14, 15 can each be closed by a blind screw. An inspection screw is provided as the blind screw.

The measure V, indicated here, means the distance between the lengthwise axis 16 and the reference edge of the shell. This measure shows the wear. In a new friction lining 13, it should have a minimum value; in the ground and worn friction lining 13, it should have a maximum value.

Instead of the principle with two holes 14, 15 as well as with a measuring pin, which is presented here, the following equivalent solution also comes into consideration:

The inner wheel 5 is furnished with a projection of any type or a marking, which can be detected from the outside in terms of its position through the hole 15 and which, when the inner wheel 5 is displaced radially outward until it stops, indicates the radial position of said projection or other means, and thus allows a conclusion to be drawn relative to the remaining thickness of the friction lining 13.

Figure 2:
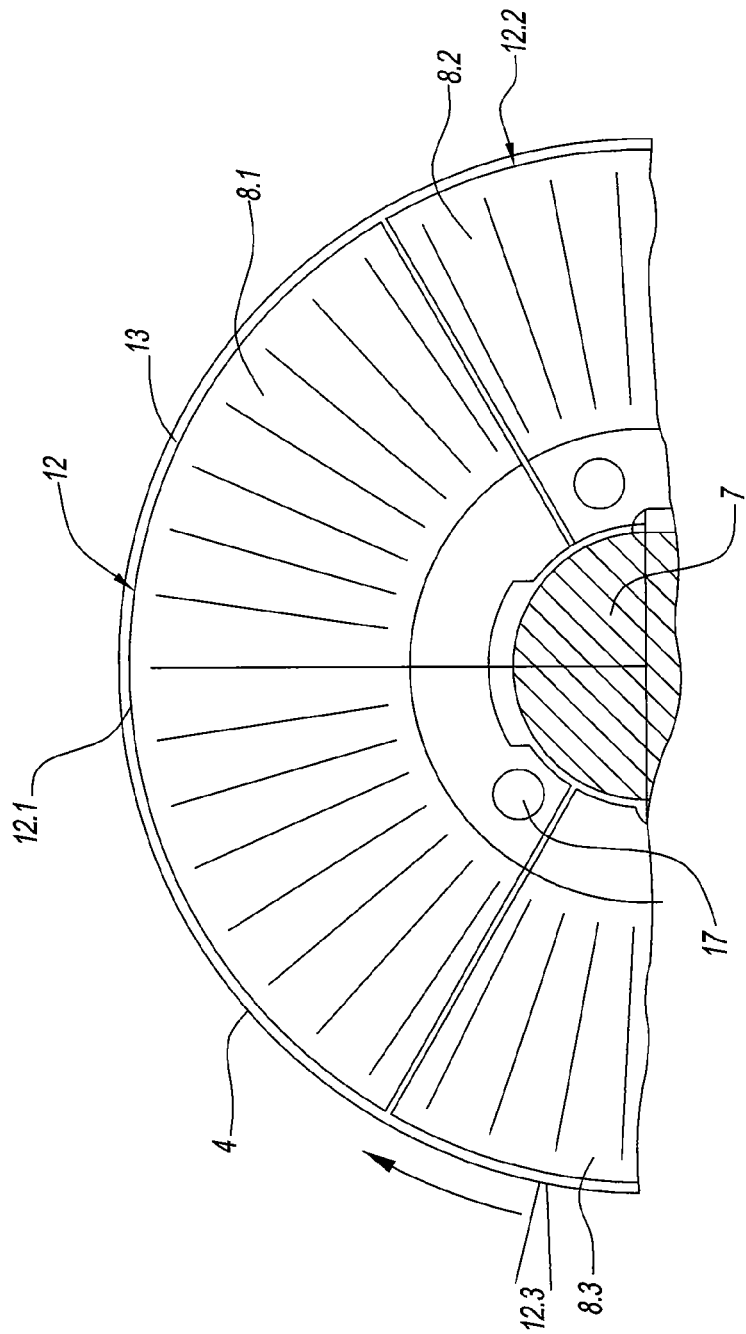
FIG. 2 shows, in plan view and in sectional view, the inner wheel that is constructed from the segments, which, in turn, can pivot.

Seen in FIG. 2 are the three mentioned segments 8.1, 8.2, 8.3.

Whereas these could be displaced directly in a radial manner in the embodiment according to FIG. 1, they are now hinged so as to pivot or tilt at their radially inner regions. Here, too, there takes place a radial movement of the segment, and if not of the complete segment, then of a part thereof.

LIST OF REFERENCE NUMBERS 1 hydrodynamic coupling
2 synchronizer clutch
3 outer wheel
4 coupling shell
5; 5.4 inner wheel
6.1 first clutch element
6.2 second clutch element
7 profiled shaft or profiled hub
8 segments of the inner wheel
8.1-8.4 segments of the inner wheel
9 means for guiding, in particular driver profile
10 toroidal working chamber
11 inner periphery of the coupling shell
12 outer periphery of the inner wheel
12.1-12.3 outer periphery of the inner wheel segments 8.1 to 8.3
13 friction lining
14 hole in the inner wheel
15 hole in the shell
16 lengthwise axis of the measuring pin
17 pivot pin

The invention claimed is:

1. A hydrodynamic coupling comprising
two blade wheels comprising an outer wheel and an inner wheel, which together form a toroidal working chamber;
a coupling shell being connected fixedly in terms of rotation with said outer wheel and which encloses a part of said inner wheel;
a synchronizer clutch, having two clutch elements, which can be brought into operative contact with the surface of a friction lining;

said inner wheel being divided into a least two segments, which can be displaced radially or be pivoted around an axis that is parallel to the rotational axis;

a first of said two clutch elements being formed by the at least two segments;

wherein the inner wheel has a hole and the coupling shell has a hole and wherein said hole of said inner wheel and said hole of said coupling shell are capable of being aligned with one another or at least partially overlapped when the inner wheel and the coupling shell are rotated relative to each other; the hole of the coupling shell being larger than the hole of the inner wheel; and a measuring pin for passing through the two holes.

2. The hydrodynamic coupling according to claim 1, wherein said measuring pin can be screwed into the hole of the inner wheel.

3. The hydrodynamic coupling according to claim 1, wherein at least one of the two holes can be closed by a blind screw.

4. The hydrodynamic coupling according to claim 1, wherein the positions of the holes are chosen in such a way that, for maximum allowable wear of the friction lining and for maximum possible radial movement of the segments, the measuring pin comes to rest at the radial outer diameter of the hole of the shell.

5. The hydrodynamic coupling according to claim 1, wherein each of the segments contains a hole for receiving the measuring pin.

* * * * *